(12) United States Patent
Shang (10) Patent No.: US 8,842,141 B2
(45) Date of Patent: Sep. 23, 2014

(54) METHOD OF UNIFORM DISTRIBUTION FOR INCREASING DISPLAY RATE

(75) Inventor: Song Shang, Guangdong (CN)

(73) Assignee: Shenzhen Zhongqing Photoelectric Display Technology Co., Ltd, Shenzhen, Guangdong Province (CN)

( * ) Notice: Subject to any disclaimer, the term of this patent is extended or adjusted under 35 U.S.C. 154(b) by 277 days.

(21) Appl. No.: 13/235,799

(22) Filed: Sep. 19, 2011

(65) Prior Publication Data

US 2012/0069030 A1    Mar. 22, 2012

(30) Foreign Application Priority Data

Sep. 19, 2010  (CN) .......................... 2010 1 0286513
Sep. 20, 2010  (CN) .......................... 2010 1 0287711
Sep. 21, 2010  (CN) .......................... 2010 1 0289160

(51) Int. Cl.
| | |
|---|---|
| G09G 5/00 | (2006.01) |
| G09G 5/02 | (2006.01) |
| G09G 5/10 | (2006.01) |
| G09G 3/30 | (2006.01) |
| G09G 3/36 | (2006.01) |
| H04N 5/202 | (2006.01) |
| H04N 9/30 | (2006.01) |
| G06F 13/14 | (2006.01) |

(52) U.S. Cl.
CPC ...................................... G06F 13/14 (2013.01)
USPC ............. 345/691; 345/581; 345/643; 345/77; 345/99; 345/600; 348/254; 348/802

(58) Field of Classification Search
USPC ........ 345/581, 589, 600–601, 606, 616–618, 345/643, 204, 690–691, 692, 46, 63, 77, 345/87–89, 94–96, 98, 99–10, 103, 201, 345/559, 560; 348/241–242, 253–254, 687, 348/727, 739, 801, 802; 358/518–525; 382/254, 274, 276
See application file for complete search history.

(56) References Cited

U.S. PATENT DOCUMENTS

| | | | |
|---|---|---|---|
| 6,483,497 B1 * | 11/2002 | Iino et al. ...................... | 345/100 |
| 2003/0034948 A1 * | 2/2003 | Imamura ........................ | 345/98 |
| 2007/0268541 A1 * | 11/2007 | Fujita et al. ................... | 359/201 |
| 2012/0113166 A1 * | 5/2012 | Murakami et al. ............ | 345/690 |

* cited by examiner

*Primary Examiner* — Wesner Sajous
(74) *Attorney, Agent, or Firm* — Tim Tingkang Xia, Esq.; Morris, Manning & Martin, LLP (57) ABSTRACT

A method of uniform distribution for increasing a display rate. For data to be displayed, dividing a complete effective output enable (OE) time that is greater than one serial shift cycle into several unit serial shift cycles and uniformly distributing the effective OE time for display. The method implements the uniform distribution of the display time to the maximum extent by using an OE signal under the condition that the whole display time remains unchanged, thereby increasing effective output number of the uniform distribution, uniformly maintaining a display effect and steadily improving a refresh rate effect, so as to effectively increase a display quality and avoid a significant loss of brightness.

19 Claims, 1 Drawing Sheet

METHOD OF UNIFORM DISTRIBUTION FOR INCREASING DISPLAY RATE

CROSS-REFERENCE TO RELATED APPLICATIONS

This non-provisional application claims priority under 35 U.S.C. §119(a) on Patent Application No. CN201010289160.4 filed in China on Sep. 21, 2010, entitled "METHOD OF UNIFORM DISTRIBUTION FOR INCREASING DISPLAY RATE", by Song SHANG, CN201010287711.3 filed in China on Sep. 20, 2010, entitled "METHOD OF DYNAMIC SELF-ADAPTIVE FOR INCREASING DISPLAY RATE", by Song SHANG, and CN201010286513.5 filed in China on Sep. 19, 2010, entitled "METHOD OF CONSTANT CHAIN LENGTH FOR INCREASING DISPLAY RATE", by Song SHANG, all of the contents of which are incorporated by reference in their entireties.

Some references, if any, which may include patents, patent applications and various publications, are cited in a reference list and discussed in the description of this invention. The citation and/or discussion of such references is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates to the control of a light-emitting diode (LED) display screen, and more particularly to a method of uniform distribution for increasing a display rate in relation to an LED display screen.

BACKGROUND OF THE INVENTION

As for an LED display screen, a display quality of the LED display screen is directly proportional to a display rate, i.e., a refresh rate of the LED display screen. When the display rate is higher, the image flicker effect is less obvious, the stability is higher and the display quality is higher. However, all the methods for increasing the display rate in the related art are implemented by sacrificing the brightness. For example, a clock rate of a control device is changed to increase the display rate, which not only has high power consumption but also has low display brightness.

Therefore, a heretofore unaddressed need exists in the art to address the aforementioned deficiencies and inadequacies.

SUMMARY OF THE INVENTION

In one aspect, the present invention is directed to increase a display rate through uniform distribution, thereby increasing a display quality.

In one embodiment, a method of uniform distribution for increasing a display rate according to the present invention includes: for data to be displayed, dividing a complete effective Output Enable (OE) time that is greater than one serial shift cycle into several unit serial shift cycles and uniformly distributing the effective OE time for display.

In a preferred embodiment, the effective OE time is uniformly distributed for display in a pulse-width modulation (PWM) manner with a serial shift chain length as a unit.

In a preferred embodiment, the method includes: acquiring K data to be displayed from a serial data chain to be displayed, in which every data to be displayed has N bits; arranging the K data to be displayed to be N K-bit data chains for serial shift in a descending order of the corresponding bits; dividing one display grayscale having Z serial shift cycles into Z independent transmission actions according to every transmission number using the serial shift time as the unit; sorting in a preset order to enable transmission actions within one grayscale to be interleaved by transmission actions within other grayscales.

In a preferred embodiment, the method includes: step A1, according to a total number of serial shift bits and a shortest switch response time, deciding time of each serial shift cycle; step A2, according to the number of bits of binary display data, deciding a grayscale quantity and data serial shift numbers in a descending order of bits; step A3, according to the grayscale quantity and the shortest switch response time, deciding a display rate, obtaining a total schedule serial shift number under the condition of the same grayscale, and obtaining an adjustment value through binary rounding; step A4, according to the adjustment value, reducing the grayscale quantity, setting values less than 1 to 1, obtaining the reduced data serial shift numbers in a descending order of bits, and for each value less than 1, correspondingly reducing an effective time of an OE signal to the complete time of the value multiplied by the OE signal; calculating the reduced total serial shift number; step A5, dividing the reduced total serial shift number respectively by every reduced data serial shift number in a descending order of bits, rounding and subtracting by 1, sequentially arranging, and obtaining a serial shift display manner of the data in a descending order of bits in the reduced total serial shift number.

In a preferred embodiment, before step A1, step A0 is executed: according to the number of bits of chip serial shift and the number of the chip serial shifts, deciding the total number of serial shift bits.

In a preferred embodiment, the serial shift number of a highest effective data bit is set to Q, the serial shift number of the subsequent data bit is reduced in half sequentially until 1, all the parts less than 1 are set to 1 until all the data bits are finished, and for all the parts less than 1, the effective time of the OE signal is reduced correspondingly to the complete time of the value multiplied by the OE signal, so as to make the total effective time of OE in the display cycle to be the same.

In a preferred embodiment, the data to be displayed is obtained, the data to be displayed whose highest bit is not 1 is shifted to left by C bits to serve as a modified display data for display to make the highest bit of the modified display data become 1, and the OE signal time is set to 1/Cth power of 2 of the complete time of the corresponding OE signal of the original display data.

In a preferred embodiment, the data to be displayed is obtained, the highest non-zero bit M is determined, the data to be displayed is shifted to left by C bits, the C bits are a difference value between the number of bits of the display data and the highest non-zero bit M, and the effective time of the OE signal is set to 1/Cth power of 2 of the complete time of the OE signal.

In a preferred embodiment, the number of bits N of the data to be displayed is set to N–C to serve as the modified number of bits of the display data, or the number of bits N of the data to be displayed is maintained to serve as the modified number of bits of the display data. The maintaining the number of bits N of the data to be displayed includes: after shifting the data to be displayed to left by C bits, randomly filling, fully filling 1 or fully filling 0 in all the C bits vacated on the right of the data to be displayed.

In a preferred embodiment, the method further includes: step B1, obtaining the data to be displayed and determining the highest non-zero bit M; step B2, subtracting the number of bits N of the data to be displayed by the highest non-zero bit M to obtain a difference value C; step B3, shifting the data to be displayed to left by C bits to serve as the modified display data for display and setting the effective time of the OE signal to 1/Cth power of 2 of the complete time of the OE signal.

In the above embodiment, before step B3, further execute the step of: according to the number of bits N of the data to be displayed, setting or selecting the effective number of bits L; and in step B3, shifting the data to be displayed to left by C bits and capturing L-bit data from the highest bit to serve as the modified display data for display.

In a preferred embodiment, the method further includes: a preset step: according to the number of bits N of the data to be displayed, setting the effective number of bits L; and a capture and call display step: for the display data, reducing the data chain length to L to serve as the modified display data for display and setting the OE signal time to 1/Cth power of 2 of the complete time of the OE signal corresponding to the original data to be displayed.

In a preferred embodiment, the effective time of the OE signal of the low grayscale data is reduced to be smaller than one display output time and all levels of data are uniformly distributed in the whole display cycle.

In a preferred embodiment, for the data in a descending order of bits, merely P-bit data are reserved starting from the highest non-zero bit M.

In a preferred embodiment, only the value of the grayscale quantity greater than or equal to 1 is selected to be reduced to obtain the P-bit data.

In another aspect, the present invention implements the uniform distribution of the display time to the maximum extent by using an OE signal under the condition that the whole display time remains unchanged, thereby increasing the effective output number of the uniform distribution, and thus achieves maintaining a display effect and steadily improving a refresh rate effect by uniform distribution, so as to effectively increase a display quality and avoid a significant loss of brightness.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment, and wherein.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

The terms used in this specification generally have their ordinary meanings in the art, within the context of the invention, and in the specific context where each term is used. Certain terms that are used to describe the invention are discussed below, or elsewhere in the specification, to provide additional guidance to the practitioner regarding the description of the invention. The use of examples anywhere in this specification, including examples of any terms discussed herein, is illustrative only, and in no way limits the scope and meaning of the invention or of any exemplified term. Likewise, the invention is not limited to various embodiments given in this specification.

In an LED control system, a display rate or referred to as a complete grayscale display rate is corresponding to a complete grayscale display cycle and is a rate corresponding to the display time of the complete grayscale, which is related to a highest switch response rate of the whole control system and data bits of the LED grayscale. Here, the complete grayscale display cycle is a total length of the overall time required for correspondingly outputting the value of every bit of the grayscale data. A lighting rate of several effective bits is the lighting number per second of an LED corresponding to one bit of the grayscale data. The output effective number of the value of the ith bit refers to in the display cycle, the effective output number corresponding to the value of the ith bit and interleaved by more than one basic clock change time. An output effective rate of the value of the ith bit refers to the output effective number of the value of the ith bit multiplied by the corresponding complete grayscale display rate. In this specification, the serial transmission is the serial shift, and the serial cycle time is the serial shift cycle, that is, the time of the length data of the serial shift, and the serial shift cycle is one serial shift time. Moreover, the OE time is the OE signal time.

According to one embodiment of the present invention, a method of uniform distribution for increasing a display rate includes: for data to be displayed, dividing a complete effective OE time that is greater than one serial shift cycle into several unit serial shift cycles and uniformly distributing the effective OE time for display. For example, the data to be displayed having 128 complete serial shift cycles is divided into 128 serial shift cycles which are uniformly output in the corresponding whole display time segment. For example, if the corresponding whole display time segment has 256 serial shift cycles, the 1st part of the data to be displayed is output in the 1st serial shift cycle, the 2nd part of the data to be displayed is output in the 3rd serial shift cycle, the 3rd part of the data to be displayed is output in the 5th serial shift cycle, . . . , the 128th part of the data to be displayed is output in the 255th serial shift cycle. Alternatively, the 1st part of the data to be displayed is output in the 2nd serial shift cycle, the 2nd part of the data to be displayed is output in the 4th serial shift cycle, the 3rd part of the data to be displayed is output in the 6th serial shift cycle, . . . , the 128th part of the data to be displayed is output in the 256th serial shift cycle.

In this manner, each corresponding display grayscale having a serial transmission number more than one has a display effective output number higher than one. The display effective output number higher than one effectively increases the display output rate.

Preferably, in the method, the effective OE time is uniformly distributed for display in a PWM manner with a serial shift chain length as a unit. For example, the display effective output time is uniformly distributed by the original consecutive PWM algorithm using the serial transmission chain length as the unit. For example, one serial shift chain length is corresponding to one effective OE time, and every serial shift chain length is uniformly distributed in each effective OE time for display, thereby obtaining a higher display refresh rate and a better display effect.

In one aspect of the present invention, the method includes: acquiring K data to be displayed from a serial data chain to be displayed, in which every data to be displayed has N bits; arranging the K data to be displayed to be N K-bit data chains for serial shift in a descending order of the corresponding bits. For example, four 16-bit data to be displayed are 1010 0011 1010 1010, 1010 1010 0011 1011, 0010 1001 1010 1000, 1000 0011 1010 0101 respectively. The four data are arranged to sixteen 4-bit serial transmission data chain from a descending order of the corresponding bits: 1010, 0011, 1010, 1010, 1010, 1010, 0011, 1011, 0010, 1001, 1010, 1000, 1000, 0011, 1010, 0101. The one display grayscale having Z serial shift cycles is divided into Z independent transmission actions according to every transmission number using the serial shift time as the unit. The transmission actions are sorted in a preset order to make the transmission actions within one grayscale interleaved by transmission actions within other grayscales.

According to one embodiment, in an example, the method includes the following steps.

Step A1, according to the total number of serial shift bits and the shortest switch response time, the time of each serial shift cycle is decided. For example, the total number of serial shift bits is 16d and the shortest switch response time is 20 ns, so the time of each serial shift cycle is 16×20 ns=320 ns. Also, for example, the total number of serial shift bits is 256 and the shortest switch response time is 50 ns, so the time of each serial shift cycle is 256×50 ns=12.8 μs. In the system, for example, generally, the highest switch response rate of the clock of the whole control system is 20 MHz, and the shortest switch response time is 50 ns. Also, when the highest switch response rate is 40 MHz, the shortest switch response time is 25 ns. Also, when the highest switch response rate is 50 MHz, the shortest switch response time is 20 ns. Preferably, before step A1, step A0 is executed: according to the number of bits of chip serial shift and the number of the chip serial shifts, the total number of serial shift bits is decided, for example, 16 bits×16 pieces or 8 bits×32 pieces, that is, the total number of serial shift bits is 256, or also 16 bits×32 pieces or 32 bits×16 pieces, that is, the total number of serial shift bits is 512.

Step A2, according to the number of bits of binary display data, a grayscale quantity and data serial shift numbers in a descending order of bits are decided. For example, the number of bits of binary display data is 16 and the grayscale quantity is 65536, so the data serial shift numbers in a descending order of bits sequentially are: 32768, 16384, 8192, 4096, 2048, 1024, 512, 256, 128, 64, 32, 16, 8, 4, 2, 1.

For the number of bits of binary display data, a common standard for data display in a computer is 8 bits, or also 16 bits, 24 bits, 32 bits. For example, the LED grayscale data uses 16 bits, that is, the grayscale after Gamma correction recognizable by physical display is 16 bits, that is, the grayscale quantity is 65536. Also, when the LED grayscale data uses 8 bits, the grayscale quantity is 256. Also, when the LED grayscale data uses 24 bits, the grayscale quantity is 16777216.

Step A3, according to the grayscale quantity and the shortest switch response time, a display rate is decided, the total schedule serial shift number under the condition of the same grayscale is obtained, and the adjustment value is obtained through binary rounding. A switch rate of the LED, that is, the physical refresh rate includes: the high-bit high grayscale physical refresh rate among the display data and the low-bit low grayscale physical refresh rate among the display data. The complete grayscale refresh rate refers to the LED lighting number per second corresponding to the complete grayscale.

For an example, the grayscale quantity is 65536 and the shortest switch response time is 50 ns, so 65536×50 ns=3.2768 ms, and the display rate is 1/3.2768 ms=305 Hz. The total schedule serial shift number under the condition of the same grayscale is 3.2768 ms/12.8 μs (time of each serial shift cycle)=260, so the adjustment value obtained through binary rounding is 256.

For another example, the grayscale quantity is 65536, the shortest switch response time is 50 ns. That is, in the time manner of realizing the grayscale, the total grayscale is 65535, and the serial shift numbers in a descending order of bits sequentially are: 32768, 16384, 8192, 4096, 2048, 1024, 512, 256, 128, 64, 32, 16, 8, 4, 2, 1, in which the serial shift time needs not to be considered. The actual used time is 50 ns, so 65535×50 ns=3.2768 ms, that is, the display rate condition is about 300 Hz.

For a further example, the total grayscale is 65536, the serial shift numbers in a descending order of bits sequentially are: 32768, 16384, 8192, 4096, 2048, 1024, 512, 256, 128, 64, 32, 16, 8, 4, 2, 1, 1. The actual used time is 50 ns, so 65536×50 ns=3.2768 ms, that is, the display rate condition is about 300 Hz.

For an alternative example, in the time manner of realizing the grayscale, the serial shift numbers in a descending order of bits sequentially are: 128, 64, 32, 16, 8, 4, 2, 1, the total is 255, the actual used time is 40 ns, and 255×40 ns=10.2 μs, that is, the display rate condition is about 98000 Hz.

Therefore, to increase the display rate under the condition of the same grayscale resolution, the serial shift number of the grayscale per bit needs to be reduced, that is, the low grayscale time is reduced in a single serial shift cycle through the OE signal.

Alternatively, the physical refresh rate is increased. As the number per unit time is the rate, only the effective display output number needs to be increased and the display time is then uniformly distributed. The embodiments of the present invention increase the display refresh rate through uniform distribution, thereby achieving a good display effect.

The lowest physical refresh rate is equivalent to the display rate. For example, the lowest physical refresh rate is 1/(12.8 μs×263)=297.05 Hz. Thus, the shortest output length of the enable signal is 1/256 of the complete serial cycle, that is, 50 ns.

Regarding the issue of the physical refresh rate, in an embodiment, all levels of data are uniformly distributed in the whole display cycle. Here, the high grayscale data is exactly divisible, or in other words, all the high grayscale data can be divided exactly, so the high grayscale data is directly uniformly distributed. For example, the 1st high bit 32768 is reduced by a multiple of 256 to obtain 128. Then, in the 263 times of the serial shift output, 263/128=2.055, which is rounded to obtain N=2, and the manner of output interleaved by (N−1) times is adopted, that is, the uniform distribution manner. That is, in the 263 times of the serial shift output, when the highest bit is 128, the highest-bit data is output once every two times of the serial shift output. For the low grayscale data that cannot be exactly divided, for example, 1/2, 1/4, 1/8, the enable signals are respectively reduced to 1/2, 1/4, 1/8 of the original signal correspondingly. That is, the unit time and the display rate lower than the unit time may be equivalent to the display rate, that is, the rate corresponding to the unit time. Also, the only difference of the display rate lower than the unit time is that the enable signal can be reduced to different extents. Specifically, the grayscale lower than the unit time may be realized by using the enable signal to realize the brightness output lower than the unit time, that is, the effective display output is generated under the condition that the effective data serial transmission is finished, the loading is succeeded and the OE signal is effective. Therefore, it is possible to realize output lower than the unit time.

For the implementation of the LED system, for example, the least switch time is 50 ns, the clock rate is 20 MHz, and the serial data transmission rate is 20 MHz, in which 20 MHz is a common value and matches the current least open time of 50 ns. The serial transmission data chain length is N×16 or N×8, that is, different categories of the serial transmission bits of the constant current driver chip, for example, 16×16=256. The serial transmission bits are the serial shift bits, in which the constant current chip signal structure is the serial data input, data clock, load signal, enable signal and the serial data output. For example, the display output effective condition includes the overall serial data transmission is finished, the data loading is succeeded and the enable signal is effective.

Therefore, for example, under the condition that 16 bits×16 pieces or 8 bits×32 pieces, that is, 256 bits, 256×50 ns=12.8 μs, that is, one serial shift cycle is 12.8 μs, that is, under the condition of the 300 Hz display rate, 1 sec/300/12.8 μs=260.42. Therefore, 260 complete serial cycles may be realized, thereby forming one complete display cycle.

Alternatively, under the condition that 16 bits×8 pieces or 8 bits×16 pieces, that is, 128 bits, 128×50 ns=6.4 μs and under the condition of 300 Hz display rate, 520 complete serial cycles are realized, or under the condition of 600 Hz display rate, 260 complete serial cycles are realized.

Here, the serial transmission time and the display output time are actually overlapped and non-independent. The display output time and the serial transmission time are equal, and if one display output time exists, the same serial transmission time is needed, both of which exist between two load signals.

Moreover, the effective time of OE signal (the enable signal for short) is limited, and the enable signal effective time should not be longer than one time segment of serial data transmission, in which the time segment of the serial data transmission is the display output time, which is unable to span the load signal. That is, the enable signal effective time may be shorter than one serial transmission clock.

Step A4, according to the adjustment value, the grayscale quantity is reduced, the value less than 1 is set to 1, the reduced data serial shift number in a descending order of bits is obtained, and for each value less than 1, the effective time of the OE signal is reduced correspondingly to the complete time of the value multiplied by the OE signal; and the reduced total serial shift number is calculated. For example, the adjustment value 256 is obtained from step A3, and in a manner of reducing the time by a multiple of 256, the serial shift numbers in a descending order of bits sequentially are: 128, 64, 32, 16, 8, 4, 2, 1, 1(1/2), 1(1/4), 1(1/8), 1(1/16), 1(1/32), 1(1/64), 1(1/128), 1(1/256), which are added to obtain 263. Therefore, the reduced total serial shift number is 263. Here, the last eight bits are the low grayscale data, and the actual effective time of the OE signal sequentially is 1/2, 1/4, 1/8, 1/16, 1/32, 1/64, 1/128, 1/256 of the original OE signal complete time, and the total is 255/256 display output cycle.

Step A5, the reduced total serial shift number is divided respectively by every reduced data serial shift number in a descending order of bits, and rounded and subtracted by 1, then sequentially arranged to obtain the serial shift display manner of the data in a descending order of bits in the reduced total serial shift number. For example, all levels of data are uniformly distributed in the whole display cycle. Alternatively, the effective time of an OE signal is shorter than one display output time. Alternatively, the OE signal is employed for control and the time of the low grayscale is reduced in a single cycle.

For example, under the condition of 260 complete serial cycles in each display refresh cycle, the highest bit cycle value is reduced to 128, the low 8-bit cycle value is reduced in a single cycle. In an example, as described above, in a manner of reducing time by a multiple of 256, the serial shift numbers in a descending order of bits sequentially are: 128, 64, 32, 16, 8, 4, 2, 1, 1(1/2), 1(1/4), 1(1/8), 1(1/16), 1(1/32), 1(1/64), 1(1/128), 1(1/256), and the total is 263. Here, the last eight bits are the low grayscale data, and the actual effective time of the OE signal sequentially are 1/2, 1/4, 1/8, 1/16, 1/32, 1/64, 1/128, 1/256 of the original OE signal time, and the total is 255/256 display output cycle.

Thus, when the physical refresh rate needs to be increased, that is, the photographing effect is enhanced, the unit time quantity must be increased, that is, the switch quantity in the unit time must be increased and uniformly distributed in the whole display cycle, so as to ensure that the increased switch quantities are not be combined as the distance is too close. For example, in the method of evenly dividing the serial shift number having the highest bit of 16 bits, the serial shift action of another bit can only be carried out when one serial shift of the highest bit of 16 bits is finished. For example, 32 can be exactly divided by 16, and as described above, is output every second time.

In one embodiment of the present invention, the serial shift number of the highest effective data bit is set to Q, the serial shift number of the subsequent data bit is reduced in half sequentially until 1, all the parts less than 1 are set to 1 until all the data bits are finished, and for all the parts less than 1, the effective time of the OE signal is reduced correspondingly to the complete time of the value multiplied by the OE signal, so as to make the total effective time of the OE in the display cycle to be the same. For example, the display number is increased by a multiple of R to the highest multiple of 128 and meanwhile, the OE effective time is 1/R, that is, the total time is R×1/R=1, so the OE shortest time remains unchanged and is still 50 ns. For example, when the lowest display number is 1, the display number may be increased to 128. Alternatively, the display number is not particularly limited in the following embodiments of the present invention and may be increased to a multiple of 256, 512, 888, 1500 or more.

In one embodiment of the present invention, all the number of bits of chip serial shift, the number of chip serial shifts and the number of bits of binary display data are 16, the total number of serial shift bits is 256, the shortest switch response time is 50 ns, the time of each serial shift cycle is 12.8 μs, the grayscale quantity is 65536, and the data serial shift numbers in a descending order of bits sequentially are: 32768, 16384, 8192, 4096, 2048, 1024, 512, 256, 128, 64, 32, 16, 8, 4, 2, 1. The display rate condition is 300 Hz, the total schedule serial shift number is 260, the adjustment value is 256, the reduced data serial shift numbers in a descending order of bits sequentially are: 128, 64, 32, 16, 8, 4, 2, 1, 1, 1, 1, 1, 1, 1, 1, 1, the reduced total serial shift number is 263. Here, the last eight bits are the low grayscale data, the effective time of the OE signal time sequentially is 1/2, 1/4, 1/8, 1/16, 1/32, 1/64, 1/128, 1/256 of the complete time of the OE signal. The serial shift display manners of the data in a descending order of bits in the reduced total serial shift number sequentially are to display once every second time, once every fourth time, once every eighth time, once every sixteenth time, once every 32nd time, once every 65th time, once every 131st time, and to display only once, only once in 1/2 of the OE time, only once in 1/4 of the OE time, only once in 1/8 of the OE time, only once in 1/16 of the OE time, only once in 1/32 of the OE time, only once in 1/64 of the OE time, only once in 1/128 of the OE time and only once in 1/256 of the OE time.

In a complete example of the present invention, a method for increasing the display rate is provided. In step A1, according to the number of chip serial shift bits, 16, and the number of chip serial shifts, 16, the total number of serial shift bits is decided to be 256. In step A2, according to the total number of serial shift bits, 256, and the shortest switch response time, 50 ns, the time of each serial shift cycle is decided to be 256 bits×50 ns=12.8 us. In step A3, according to the number of bits of binary display data, 16, the grayscale quantity is decided to be 65536, and the data serial shift numbers in a descending order of bits sequentially are: 32768, 16384, 8192, 4096, 2048, 1024, 512, 256, 128, 64, 32, 16, 8, 4, 2, 1. In step A4, according to the grayscale quantity, 65536, and the shortest switch response time, 50, ns, the display rate condition is decided to be 1/(65536×50 ns)=305 Hz, the total schedule serial shift number is obtained to be 1 second/305/12.8 μs=256.14 under the condition of the same grayscale, the adjustment value is obtained to be 256 through binary rounding. In step A5, according to the adjustment value, the grayscale quantity is reduced in the same proportion, 32768/256=128, 16384/256=64, 8192/256=32, . . . , and the values less than 1 are all set to be 1, the reduced data serial shift numbers in a descending order of bits are obtained to be 128, 64, 32, 16, 8, 4, 2, 1, 1 (the actual result is 1/2), 1 (the actual result is 1/4), 1 (the actual result is 1/8), 1 (the actual result is 1/16), 1 (the actual result is 1/32), 1 (the actual result is 1/64), 1 (the actual result is 1/128), 1 (the actual result is 1/256), and the effective time of the OE of all the values less than 1, that is, 1/2, 1/4, 1/8, . . . , 1/256, are correspondingly reduced to the value multiplied by 1/2, 1/4, 1/8, . . . , 1/256 of the complete time of the OE. Under the condition of reducing by a multiple of 256, the reduced total serial shift number is calculated to be 263. The reduced total serial shift number 263 are respectively divided by the reduced data serial shift numbers of all bits, 128, 64, 32, 16, 8, 4, 2, 1, 1(1/2), 1(1/4), 1(1/8), 1(1/16), 1(1/32), 1(1/64), 1(1/128), 1(1/256), rounded and subtracted by 1, sequentially arranged to obtain that the serial shift display manners of the data of all bits in the reduced total serial shift number sequentially are to display once every second time, once every fourth time, once every eighth time, once every sixteenth time, once every 32nd time, once every 65th time, once every 131st time, and to display only once, only once in 1/2 of the complete OE time, only once in 1/4 of the complete OE time, only once in 1/8 of the complete OE time, only once in 1/16 of the complete OE time, only once in 1/32 of the complete OE time, only once in 1/64 of the complete OE time, only once in 1/128 of the complete OE time and only once in 1/256 of the complete OE time.

Alternatively, in the above example, the system data is initialized, the data to be displayed is acquired, and the reduced data of all bits of the data to be displayed are serially shifted by 128, 64, 32, 16, 8, 4, 2, 1, 1(1/2), 1(1/4), 1(1/8), 1(1/16), 1(1/32), 1(1/64), 1(1/128), 1(1/256). That is, if the total display number is 263 in one display cycle, the 1st bit in a descending order is displayed once in the complete OE time, and later, is displayed every second time until being displayed 128 times. The 2nd bit in the descending order is displayed once in the complete OE time, and later, is displayed every fourth time again in the complete OE time until being displayed 64 time. Similarly, for 1/2, 1/4, 1/8, . . . , and 1/256 are sequentially displayed once at the interval, and the corresponding display time is 1/2 of the complete OE time, 1/4 of the complete OE time, 1/8 of the complete OE time, . . . , and 1/256 of the complete OE time.

In the above embodiments, the data to be displayed is obtained, and after reduction, the data to be displayed whose highest bit is not 1 is shifted to left by C bits to serve as the modified display data for display to make the highest bit of the modified display data become 1, and the effective time of the OE is set to 1/Cth power of 2 of the OE complete time corresponding to the original display data. Alternatively, the data to be displayed is obtained, and the data to be displayed whose highest bit is not 1 is directly shifted to left by C bits to serve as the modified display data for display to make the highest bit of the modified display data become one, and the effective time of the OE is set to 1/Cth power of 2 of the complete time of the OE corresponding to the original display data. For example, the data to be displayed is obtained, the highest non-zero bit M is determined, the data to be displayed is shifted to left by C bits, the C bits are a difference value between the number of bits of the display data and the highest non-zero bit M, and the effective time of the OE signal is set to 1/Cth power of 2 of the complete time of the OE signal. For example, the above operation is carried out after reduction, that is, the highest non-zero bit M is determined and the data to be displayed is shifted to left by C bits to serve as the modified display data for display.

The number of bits N of the data to be displayed is set to N-C to serve as the modified number of bits of the display data. Alternatively, the number of bits N of the data to be displayed is maintained to serve as the modified number of bits of the display data. The maintaining the number of bits N of the data to be displayed includes: after shifting the data to be displayed to left by C bits, randomly filling, fully filling 1 or fully filling 0 in all the C bits vacated on the right of the data to be displayed. For example, before the data is reduced or after the data is reduced, the method includes: step B1, obtaining the data to be displayed and determining the highest non-zero bit M; step B2, subtracting the number of bits N of the data to be displayed by the highest non-zero bit M to obtain a difference value C; step B3, shifting the data to be displayed by C bits to serve as the modified display data for display and setting the effective time of the OE signal to 1/Cth power of 2 of the complete time of the OE signal. Preferably, before step B3, further executes the step of: according to the number of bits N of the data to be displayed, the effective number of bits L is set or selected. Also, in step B3, the data to be displayed is shifted to left by C bits, and the L-bit data is captured from the highest bit to serve as the modified display data for display.

Figure 1:
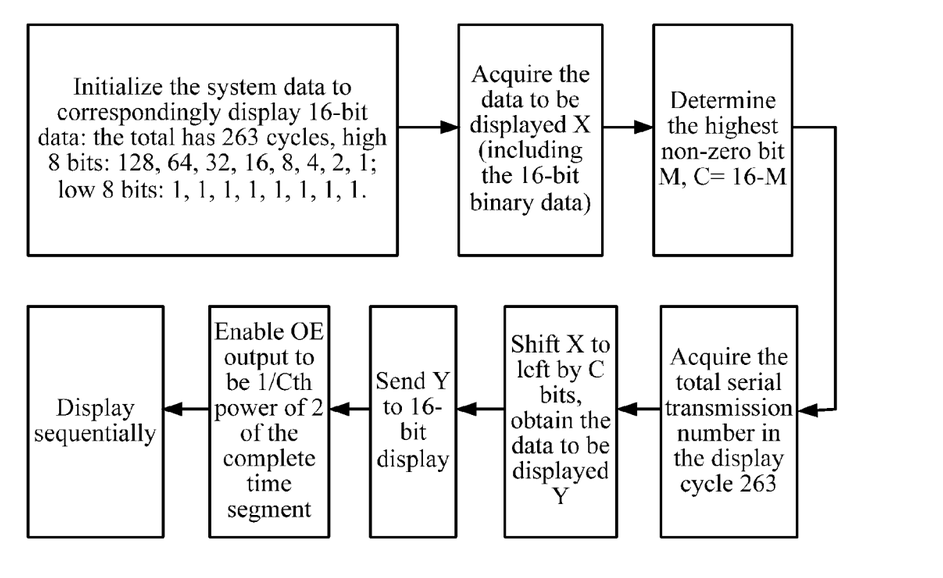
FIG. 1 is a flow chart of calculation based on 16 bits according to an embodiment of the present invention.

In one embodiment, referring to FIG. 1, the system data is initialized, the 16-bit data, 263 cycles in total, is correspondingly displayed. The high 8 bits are: 128, 64, 32, 16, 8, 4, 2, 1, and the low 8 bits are: 1, 1, 1, 1, 1, 1, 1, 1. The data to be displayed X (including the 16-bit binary data) is acquired, and the highest non-zero bit M is determined, C=16−M, the total serial transmission number in the display cycle is acquired to be 263, X is shifted to left by C bits to obtain the data to be displayed Y. Then, Y is sent to 16-bit display, so that the OE output is 1/C or 1/Cth power of 2 of the complete time segment and then sequentially displayed.

In another embodiment, before the data is reduced or after the data is reduced, the method further includes: a preset step: according to the number of bits N of the data to be displayed, setting the effective number of bits L; and a capture and call display step: for the display data, reducing the data chain length to L to serve as the modified display data for display and setting the OE signal time to 1/Cth power of 2 of the complete time of the OE signal corresponding to the original data to be displayed.

In the above embodiments, in the method, the effective time of the OE signal of the low grayscale data is reduced to be smaller than one display output time and all levels of data are uniformly distributed in the whole display cycle. In the above embodiments, in the method, for the data in a descending order of bits, P-bit data are reserved merely starting from the highest non-zero bit M. In the above embodiments, in the method, only the value of the grayscale quantity greater than or equal to 1 is selected to be reduced to obtain the P-bit data.

Regarding the display brightness loss rate in all the above embodiments, theoretically, the display below the non-unit display time does not have the brightness loss. In the display below the unit display time, the effective time ratio of the enable signal is the effective rate or otherwise is the loss rate. For example, the highest switch response rate is 20 MHz, the LED grayscale data bit is 16 bits, and in the manner of reducing time by a multiple of 256, the serial shift numbers in a descending order of bits sequentially are: 128, 64, 32, 16, 8, 4, 2, 1, 1, 1, 1, 1, 1, 1, 1, 1. Here, the high 8 bits 128, 64, 32, 16, 8, 4, 2, 1 does not have brightness loss and the low 8 bits 1, 1, 1, 1, 1, 1, 1, 1 have certain brightness loss. The total is 128+64+32+16+8+4+2+1+1+1+1+1+1+1+1+1=263, that is, the time of 263 complete serial shift cycles is 12.8 μs×263=3.37 ms, the corresponding low-bit display rate is 294.74 Hz, and the display rate is 294.74 Hz. The possible shortest display time interval of the highest bit is 12.8 μs×263/128=26.3 μs, the corresponding display rate is 38022.8 Hz, and the least OE time is 12.8 μs/256=50 ns. The loss rate is calculated as follows. The loss of the low 8 bits is: 1/2, 3/4, 7/8, 15/16, 31/32, 63/64, 127/128, 255/256, and the total is about 7. Therefore, the highest brightness loss rate is 7/263=2.66%.

In another embodiment, for the static frequency doubling display manner, the manner of reduction by a multiple of 256 and then raising the low bit by a multiple of 16, the serial shift numbers in a descending order of bits sequentially are: 128, 64, 32, 16, 16, 16, 16, 16, 16, 16, 16, 16, 16, 16, 16, 16, the total is 432, and at this time the rate is increased to 1×16/(12.8 μs×432)=2893.5 Hz. Hereinafter, the loss rate is calculated, the high 4 bits 128, 64, 32, 16 remain unchanged, and the loss of the rest low 12 bits sequentially is: 8, 12, 14, 15, 15+1/2, 15+3/4, 15+7/8, 15+15/16, 15+31/32, 15+63/64, 15+127/128, 15+255/256, and the total is about 170. Therefore, the highest brightness loss rate is 170/432=39.35%.

Hereinafter, the algorithm is further explained. The effective grayscale resolution to the naked eyes of the viewer does not exceed 10 bits, for example, 8 bits. Therefore, theoretically, the naked eyes cannot identify the brightness difference below 2%. When the high bit has the effective bit, the display rate is high, and it is difficult for the video recording equipment or human eyes to capture the low frequency effect of the brightness of the low bits. According to the above calculated rate, the rate may raise to exceed 37000 Hz.

Specifically, a dynamic self-adaptive algorithm may also be referred to as a dynamic data chain length display algorithm. That is, only the bit data is reserved starting from the highest effective bit for display, and on the basis of reducing the whole display cycle time, the display refresh rate is increased. For example, the highest effective bit of the data is always 128, the other low bits automatically extend the display resolution precision in sequence sequentially downwards. Here, the highest effective bit of data is the first non-zero bit from the highest bit sequentially downwards. Alternatively, the highest effective bit of the data is always 256, and the other low bits automatically extend the display resolution precision in sequence sequentially downwards, and so forth. In the above examples, the dynamic self-adaptive algorithm increases the display serial shift number, and inevitably increases the response display time, which needs to be reduced accordingly in each display time segment, thereby ensuring the effective integral time being all the same in the display cycle. For example, the specific realization method includes: increasing the display serial shift number by a multiple of N to 128, and performing reduction in the effective display time in the OE manner, that is, the OE time is 1/N of the original time.

Also, in the above embodiments, for the data in a descending order of bits, the P-bit data is reserved merely starting from the highest non-zero bit M. For example, only the value of reduced grayscale quantity which is greater than or equal to 1 is chosen to obtain the P-bit data.

Specifically, an effective grayscale resolution algorithm includes that the highest effective bit of the data automatically extends display resolution precision in sequence downwards to 8 bits or 10 bits. Alternatively, a constant data chain length display algorithm includes reserving the high M bits only or reserving the high M bits starting from the highest effective bit for display, thereby increasing the display refresh rate on the basis of reducing the whole display cycle time.

For example, the manner of reducing the time by a multiple of 256 is employed. When the highest effective bit is 16, the dynamic self-adaptive algorithm is adopted and the 16-bit serial shift number in a descending order sequentially are: 128, 64, 32, 16, 8, 4, 2, 1, 1, 1, 1, 1, 1, 1, 1, 1, and the total serial shift number is 263. The display time of the high effective bit is 12.8 μs×263/128=26.33 μs, the display rate of the high effective bit is 37979.5 Hz. Similar to the above description, the loss of the low 8 bits sequentially is: 1/2, 3/4, 7/8, 15/16, 31/32, 63/64, 127/128, 255/256 and the total is about 7, so the highest brightness loss rate is 7/263=2.66%.

Alternatively, the effective grayscale resolution algorithm is adopted. For example, the high 8 bits are effective. The eight serial shift numbers in the descending order of bits sequentially are: 128, 64, 32, 16, 8, 4, 2, 1, and the total serial shift number is reduced to 255. At this time, the display time of the high effective bit is reduced to 12.8 μs×255/128=25.5 μs and the display rate of the high effective bit is 39215.7 Hz. The loss rate is calculated and the low bit is 0, so the highest brightness loss rate is 0.

In another embodiment, the manner of reducing time by a multiple of 256 is adopted. When the highest effective bit is set to 13, the dynamic self-adaptive algorithm is adopted, 16−13=3, so the total serial shift number is reduced by 3 bits from 263 to 260, and the serial shift numbers in a descending order of bits sequentially are: 128, 64, 32, 16, 8, 4, 2, 1, 1, 1, 1, 1, 1. The display time of the high effective bit is reduced to 12.8 μs×260/128=26. μs, and the display rate of the high effective bit is 38461.5 Hz. At this time, the highest brightness loss rate is 4/260=1.54%.

Alternatively, the effective grayscale resolution algorithm is adopted, the serial shift numbers in a descending order of bits sequentially are: 128, 64, 32, 16, 8, 4, 2, 1, and the total serial shift number is reduced to 255. The display time of the high effective bit is reduced to 12.8 μs×255/128=25.5 μs and the display rate of the high effective bit is 39215.7 Hz. The loss rate is calculated and the low bit is 0, so the highest brightness loss rate is 0.

In another embodiment, the manner of reducing time by a multiple of 256 is adopted. When the highest effective bit is set to 8, the dynamic self-adaptive algorithm is adopted, the total serial shift number is reduced by 3 bits to 260, and the serial shift numbers in a descending order of bits sequentially are: 128, 64, 32, 16, 8, 4, 2, 1. The display time of the high effective bit is reduced to 12.8 μs×255/128=25.5 μs, and the display rate of the high effective bit is 39215.7 Hz. At this time, the highest brightness loss rate is 0.

Alternatively, the effective grayscale resolution algorithm is adopted, the total serial shift number is reduced to 255, and the serial shift numbers in a descending order of bits sequentially are: 128, 64, 32, 16, 8, 4, 2, 1. The display time of the high effective bit is reduced to 12.8 μs×255/128=25.5 μs, and the display rate of high effective bit is 39215.7 Hz. The loss rate is calculated and the low bit is 0, so the highest brightness loss rate is 0.

The above embodiments may be combined and may also be combined with the above-mentioned constant chain length method to further increase the refresh rate and obtain the better display effect, which will be explained in detail as follows. According to an embodiment of the present invention, a method for increasing the display rate with the constant chain length is a display method using the constant display data precision, which includes a preset step and a capture and call display step.

Here, the preset step includes: setting the effective number of bits L. For example, the effective number of bits L is a natural number selected from among 4, 5, 6, . . . , and 255. Also, the effective number of bits L is a natural number selected from among 4, 5, 6, . . . , 128, 129, . . . , 255, 256, . . . , 510, 511, . . . , 65535. Preferably, the effective number of bits L is set according to the number of bits of the display data. For example, the number of bits of the display data is 16, L may be set to 12, 10, 8 or 7. Also, the number of bits of the display data is 256, L may be set to 200, 180, 150 or 100. On the above basis, in a preferred embodiment, before setting the effective number of bits L, further comprises the step of obtaining the number of bits N of the display data. Also, in the setting step, according to the value of N, the effective number of bits L is set. At this time, the effective number of bits L is normally smaller than N. Alternatively, the effective number of bits L is set according to a certain highest brightness loss rate. For example, when the highest brightness loss rate is assumed to be not higher than 10%, the effective number of bits L is set accordingly. In the above examples, a relationship table between the value of N and the value of L may be established, and the effective number of bits L is selected according to the value of N. Alternatively, a relationship table between the highest brightness loss rate and the value of L may be established, and the effective number of bits L is selected according to the highest brightness loss rate.

The capture and call display step includes: for the display data, reducing the data chain length to L to serve as the modified display data for display. It should be noted that due to space limitations, in the following examples, the data lower than 24 bits is generally used for illustration. However, the number of bits of the display data is not particularly limited in the present invention and all the embodiments as long as the data chain length can be reduced.

In an example, in the reducing the data chain length to L step, for the display data, the L-bit data output is captured from the high bit to serve as the modified display data for display. For example, for the display data, the L-bit data output is captured from the highest bit to serve as the modified display data for display. It is assumed that one display data has 16 bits, as shown in the following table:

| | Bit Number | | | | | | | | | | | | | | | |
|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 |
| Data | 1 | 0 | 0 | 1 | 0 | 0 | 1 | 1 | 0 | 1 | 1 | 1 | 0 | 0 | 0 | 1 |

When L is 13, the lowest 3 bits of the original display data are discarded, and the modified display data has 13 bits as shown in the following table:

| | Bit Number | | | | | | | | | | | | |
|---|---|---|---|---|---|---|---|---|---|---|---|---|---|
| | 13 | 12 | 11 | 10 | 9 | 8 | 7 | 6 | 5 | 4 | 3 | 2 | 1 |
| Data | 1 | 0 | 0 | 1 | 0 | 0 | 1 | 1 | 0 | 1 | 1 | 1 | 0 |

When L is another value, it can be deduced in the same way and the details will not be repeated herein. Alternatively, for the display data, the L-bit data output is captured from the second highest high bits to serve as the modified display data for display. It is assumed that one display data has 12 bits as shown in the following table:

| | Bit Number | | | | | | | | | | | |
|---|---|---|---|---|---|---|---|---|---|---|---|---|
| | 12 | 11 | 10 | 9 | 8 | 7 | 6 | 5 | 4 | 3 | 2 | 1 |
| Data | 1 | 0 | 1 | 1 | 0 | 1 | 1 | 0 | 0 | 1 | 0 | 1 |

When L is 10, the lowest 3 bits of the original display data are discarded, and the modified display data is 10 bits as shown in the following table:

| | Bit Number | | | | | | | | | |
|---|---|---|---|---|---|---|---|---|---|---|
| | 10 | 9 | 8 | 7 | 6 | 5 | 4 | 3 | 2 | 1 |
| Data | 0 | 1 | 1 | 0 | 1 | 1 | 0 | 0 | 1 | 0 |

When L is another value, it can be deduced in the same way and the details will not be repeated herein. In another example, in the reducing the data chain length to L step, according to the effective number of bits L, for the display data having a length of N bits, the L-bit data output is captured sequentially starting from the first high bit 1. For example, one display data has 16 bits, that is N=16, as shown in the following table:

| Bit Number | | | | | | | | | | | | | | | |
|---|---|---|---|---|---|---|---|---|---|---|---|---|---|---|---|
| 16 | 15 | 14 | 13 | 12 | 11 | 10 | 9 | 8 | 7 | 6 | 5 | 4 | 3 | 2 | 1 |
| Data 0 | 0 | 0 | 1 | 1 | 0 | 1 | 0 | 0 | 1 | 0 | 1 | 0 | 0 | 1 | 0 |

The bits having the first high bit 1 is the 13th bit, and when L is 9, the highest 3 bits and lowest 4 bits of the original display data are discarded, and the modified display data has 9 bits as shown in the following table:

| Bit Number | | | | | | | | | |
|---|---|---|---|---|---|---|---|---|---|
| 9 | 8 | 7 | 6 | 5 | 4 | 3 | 2 | 1 | |
| Data 1 | 1 | 0 | 1 | 0 | 0 | 1 | 0 | 1 | |

Alternatively, N=8, one display data has 8 bits as shown in the following table:

| Bit Number | | | | | | | | |
|---|---|---|---|---|---|---|---|---|
| 8 | 7 | 6 | 5 | 4 | 3 | 2 | 1 | |
| Data 0 | 0 | 1 | 1 | 0 | 0 | 1 | 0 | |

The bits having the first high bit 1 is the 6th bit, and when L is 6, the highest 2 bits of the original display data are discarded, and the modified display data has 6 bits as shown in the following table:

| Bit Number | | | | | | |
|---|---|---|---|---|---|---|
| 6 | 5 | 4 | 3 | 2 | 1 | |
| Data 1 | 1 | 0 | 0 | 1 | 0 | |

In the applications of the above examples, before the reducing the data chain length to L step, further executes the step of: for the display data, determining the highest non-zero bit M; and in the reducing the data chain length to L step, for the display data, the L-bit data output is captured starting from the M bit. At this time, the display time of the modified display data is far lower than the display time of the original display data.

For example, one display data has 18 bits as shown in the following table:

| Bit Number | | | | | | | | | | | | | | | | | | |
|---|---|---|---|---|---|---|---|---|---|---|---|---|---|---|---|---|---|---|
| 18 | 17 | 16 | 15 | 14 | 13 | 12 | 11 | 10 | 9 | 8 | 7 | 6 | 5 | 4 | 3 | 2 | 1 | |
| Data 0 | 0 | 0 | 0 | 1 | 1 | 1 | 0 | 1 | 0 | 0 | 1 | 0 | 1 | 0 | 0 | 1 | 0 | |

The highest non-zero bit M is the 14th bit, and when L is 8, in the reducing the data chain length to L step, for the display data, the 8-bit data output is captured starting from the 14th bit, and the highest 4 bits and lowest 6 bits of the original display data are discarded, and the modified display data has 8 bits as shown in the following table:

| Bit Number | | | | | | | | |
|---|---|---|---|---|---|---|---|---|
| 8 | 7 | 6 | 5 | 4 | 3 | 2 | 1 | |
| Data 1 | 1 | 1 | 0 | 1 | 0 | 0 | 1 | |

In the applications to all the related examples, after the determining the highest non-zero bit M step and before the reducing the data chain length to L step, further executes the step of: determining if the number of bits N of the display data is greater than L, and if not, directly outputting the display data for display. That is, if the value of L is greater than the number of bits N of the display data, the capture and call display step is not needed and the display data is directly output for display. If the value of L is smaller than the number of bits N of the display data, the reducing the data chain length to L step is executed.

For example, one display data has 12 bits as shown in the following table:

| Bit Number | | | | | | | | | | | | |
|---|---|---|---|---|---|---|---|---|---|---|---|---|
| 12 | 11 | 10 | 9 | 8 | 7 | 6 | 5 | 4 | 3 | 2 | 1 | |
| Data 0 | 0 | 1 | 0 | 0 | 1 | 1 | 0 | 0 | 1 | 1 | 1 | |

When L is 20, in the reducing the data chain length to L step, for the display data, the display data is output for display, and the modified display data is the original display data. Alternatively, the display data is directly output without modification.

In the application to the above example, after the determining the highest non-zero bit M step and before the reducing the data chain length to L step, further executes the step of: determining if M is greater than L, and if not, directly capturing the L-bit data output starting from the Lth bit. That is, if the value of L is greater than the highest non-zero bit M of the display data, the L-bit data output is directly captured starting from the Lth bit. For example, one display data has 24 bits as shown in the following table:

| Bit Number | | | | | | | | | | | | | | | | | | | | | | | | |
|---|---|---|---|---|---|---|---|---|---|---|---|---|---|---|---|---|---|---|---|---|---|---|---|---|
| 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
| Data 0 | 0 | 0 | 0 | 0 | 1 | 0 | 0 | 0 | 0 | 1 | 1 | 1 | 0 | 1 | 0 | 0 | 1 | 0 | 1 | 0 | 0 | 1 | 0 |

The highest non-zero bit M is the 19th bit. When L is 20, in the reducing the data chain length to L step, for the display data, the 20-bit data output is directly captured starting from the 20th bit, and the modified display data has 20 bits as shown in the following table:

| Bit Number | | | | | | | | | | | | | | | | | | | | |
|---|---|---|---|---|---|---|---|---|---|---|---|---|---|---|---|---|---|---|---|---|
| 20 | 19 | 18 | 17 | 16 | 15 | 14 | 13 | 12 | 11 | 10 | 9 | 8 | 7 | 6 | 5 | 4 | 3 | 2 | 1 |
| Data 0 | 1 | 0 | 0 | 0 | 0 | 1 | 1 | 1 | 0 | 1 | 0 | 0 | 1 | 0 | 1 | 0 | 0 | 1 | 0 |

If the value of L is smaller than the number of bits M of the display data, the L-bit data output may be captured starting from the M bit.

In the application to any one of the above examples, in the method, after the reducing the data chain length to L step, further executes the step of: displaying according to the modified display data, for example, the modified display data is sent to a driver chip for driving the corresponding LED lamp to emit light or not, so as to realize display on the LED display screen to obtain the display effect. For example, in the step of displaying according to the modified display data, in a time segment, according to the modified display data with the reduced data chain length, the display time of the corresponding display data is reduced and the effective number of the data display is increased, thereby increasing the display refresh rate.

Thus, the low bits may lose a part of brightness, but the brightness loss rate is relatively low, so the low grayscale display ability is increased under the condition that the display precision always remains unchanged.

Hereinafter, in another aspect, the embodiments of the present invention are further explained. For the viewer, the effective grayscale resolution of the naked eyes does not exceed 10 bits, for example, 8 bits. Therefore, theoretically, the naked eyes cannot recognize the brightness difference below 2%. Therefore, a part of the display data may be properly deleted, and the highest brightness area or the lowest brightness area is subject to a certain loss, thereby increasing the display refresh rate.

In a preferred embodiment, for the data in a descending order of bits, the P-bit data is reserved just starting from the highest non-zero bit M. Specifically, the highest effective bit of the data automatically extends the display resolution precision in sequence downwards to 8 bits or 10 bits. Alternatively, only the high L bits starting from the highest effective bit M are reserved for display, thereby increasing the display refresh rate on the basis of reducing the whole display cycle time.

For example, corresponding to the 65536 display grayscale, it is assumed that four 16-bit display data corresponding to the serial display data chain are displayed in binary codes, which respectively are 1010 1110 1010 1010, 0110 1010 1010 1011, 0010 1110 1010 1100, 0000 0011 1010 1101. Due to the relative adaptive mechanism of the naked eyes to brightness, different brightness is that the high effective bits realize the display functions. The 8-bit long display format that can provide the sufficient visual effect is selected.

Four 8-bit data are respectively captured from the highest non-zero bit of the display data: 1010 1110, 11010101, 1011 1010, 1110 1011. The rest display data may be deduced in the same manner. As the display data chain length is reduced, the display time is reduced. Therefore, in the same time segment, the display effective number is increased, and the display refresh rate is increased.

The above embodiments may be combined and the above-mentioned dynamic self-adaptive method may also be combined to further increase the refresh rate and obtain a better display effect, which will be explained in detail as follows. A method for increasing the display rate includes: shifting the data to be displayed whose highest bit is not 1 to left by C bits to serve as the modified display data for display to make the highest bit of the modified display data become 1, and setting the OE signal time to 1/Cth power of 2 of the complete time of the OE signal corresponding to the original display data. For example, the value of C is preset. For example, C is set to 1, 2, 3, . . . , 32768. Preferably, the value of C is preset according to the number of bits N of the data to be displayed. For example, N=256, C=128. Also, N=256, C=3. Also, N=128, C=15. Also, N=65536, C=3000. Also, N=16, C=2. Also, N=8, C=3, which is not particularly limited in the present invention and all the embodiments.

Here, the switch rate of the LED, that is, the physical refresh rate includes: the high-bit high grayscale physical refresh rate among the display data and the low-bit low grayscale physical refresh rate among the display data. The complete grayscale refresh rate refers to the LED lighting number per second corresponding to the complete grayscale. That is, to increase the physical refresh rate, as the number per unit time is the rate, only the effective display output number needs to be increased to achieve a good display effect.

In the above embodiments, the OE signal time of the modified display data is respectively reduced to 1/2, 1/4 or 1/8 of the original time correspondingly. Due to the unit time, the time may be equivalent to the display rate, that is, the rate corresponding to the unit time. Also, the only difference of the display time lower than the unit time lies in that the enable signal is reduced to some extent. Specifically, the grayscale lower than the unit time may be realized by using the enable signal to realize the brightness output lower than the unit time, that is, the effective display output is generated under the condition that the effective data serial transmission is finished, the load is succeeded and the OE signal is effective. Therefore, it is possible to realize the output lower than the unit time. Thus, the effective time of an OE signal is shorter than one display output time, and when the physical refresh rate needs to be increased, the capturing effect is enhanced, so the unit time quantity is increased, that is, the switch quantity in the unit time is increased.

In the above embodiments, in an example, the number of bits N of the data to be displayed is maintained to be the modified number of bits of the display data. Here, the maintaining the number of bits N of the data to be displayed includes: after shifting the data to be displayed to left by C bits, randomly filling, fully filling 1 or fully filling 0 in all the C bits vacated on the right of the data to be displayed. For example, after the data to be displayed is shifted to left by C bits, the vacated C bits on the right may be set at will, and may be randomly filled, fully filled with 1 or fully filled with 0 to make the modified display data maintain the N bit, that is, the original number of bits of the data to be displayed.

In the related embodiments, in another example, the number of bits N of the data to be displayed is set to N−C to serve as the modified number of bits of the display data. For example, when the number of bits of the data to be displayed has 16 bits and C is 4, and the modified number of bits of the display data has 12 bits. For the viewer, the effective gray-scale resolution for the naked eyes does not exceed 10 bits, for example, 8 bits. Therefore, theoretically, the naked eyes cannot recognize the brightness difference below 2%. When the high bit has the effective bit, the display rate is high, it is difficult for the video recording equipment or human eyes to capture the low frequency effect of the brightness of the low bit. Therefore, preferably, the modified number of bits of the display data has 10 bits or 8 bits.

In the above embodiments, in another example, the method includes the following steps.

In step B1, the data to be displayed is obtained and the highest non-zero bit M is determined. It is assumed that one display data has 16 bits as shown in the following table:

| | Bit Number | | | | | | | | | | | | | | | |
|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 |
| Data | 0 | 0 | 0 | 0 | 0 | 1 | 1 | 1 | 0 | 1 | 1 | 1 | 0 | 0 | 0 | 1 |

The highest non-zero bit M is 11.

In step B2, the number of bits N of the data to be displayed is adopted and subtracted by the highest non-zero bit M to obtain the difference value C; that is, C=N−M=16−11=5.

In step B3, the data to be displayed is shifted to left by C bits to obtain the data of the N−C bits to serve as the modified display data for display, and the effective time of an OE signal is set to 1/Cth power of 2 of the complete time of the OE signal. The modified display data is as shown in the following table:

| | Bit Number | | | | | | | | | | |
|---|---|---|---|---|---|---|---|---|---|---|---|
| | 11 | 10 | 9 | 8 | 7 | 6 | 5 | 4 | 3 | 2 | 1 |
| Data | 1 | 1 | 1 | 0 | 1 | 1 | 1 | 0 | 0 | 0 | 1 |

The OE effective time S1 of the modified display data is set to 1/25 of the OE complete time S0, that is S1=S0/32. Also, it is assumed that when C is 3, the OE effective time S1 of the modified display data is 1/23 of the OE complete time S0, that is, S1 is 1/8 of S0.

Alternatively, the data to be displayed is shifted to left by C bits, the number of bits N of the data to be displayed is maintained, and the C bits vacated on the right of the data to be displayed are randomly filled, fully filled with 1 or fully filled with 0. The N-bit data is obtained to serve as the modified display data for display, and the effective time of an OE signal is set to 1/Cth power of 2 of the complete time of the OE signal. That is, if the number of bits of the display data remains unchanged, the modified display data is as shown in the following table:

| | Bit Number | | | | | | | | | | | | | | | |
|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 |
| Data | 1 | 1 | 1 | 0 | 1 | 1 | 1 | 0 | 0 | 0 | 1 | 0 | 0 | 0 | 0 | 0 |

In another embodiment, the following steps are executed. The data to be displayed is acquired, the highest non-zero bit M is determined, the number of bits N of the data to be displayed is acquired and subtracted by the highest non-zero bit M to obtain the difference value C. The data to be displayed is shifted to left by C bits, and the C bits vacated on the right of the data to be displayed are randomly filled, fully filled with 1 or fully filled with 0 to obtain the N-bit modified display data. The OE signal effective time is set to 1/Cth power of 2 of the complete time of the OE signal and the data is output for display.

In another embodiment, the following steps are executed. The system data is initialized, and the data to be displayed is obtained from the serial display data chain in sequence. For any data to be displayed X, the highest non-zero bit M is determined, set C=16−M, the data to be displayed X is shifted to left by C bits to obtain the modified display data Y which is sent for 16-bit display. The effective time of the OE signal is set to 1/Cth power of 2 of the complete time of the OE signal, thereby sequentially modifying and displaying the data to be displayed of the serial display data chain. For example, the data to be displayed X is as shown in the following table:

| | Bit Number | | | | | | | | | | | | | | | |
|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 |
| Data | 0 | 0 | 1 | 0 | 1 | 0 | 1 | 0 | 0 | 1 | 0 | 1 | 0 | 1 | 1 | 0 |

The highest non-zero bit M=14 and C=16−M=2. The data to be displayed X is shifted to left by C bits to obtain the modified display data Y as shown in the following table:

| | Bit Number | | | | | | | | | | | | | | | |
|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 |
| Data | 1 | 0 | 1 | 0 | 1 | 0 | 0 | 1 | 0 | 1 | 0 | 1 | 1 | 0 | 0 | 0 |

The above modified display data Y is sent for 16-bit display, and the effective time of an OE signal is set to 1/4 of the complete time of the OE signal, thereby sequentially modifying and displaying the data to be displayed of the serial display data chain. Alternatively, as described above, the data chain length may be reduced to obtain the modified display data Y as shown in the following table:

| | Bit Number | | | | | | | | | | | | | |
|---|---|---|---|---|---|---|---|---|---|---|---|---|---|---|
| | 14 | 13 | 12 | 11 | 10 | 9 | 8 | 7 | 6 | 5 | 4 | 3 | 2 | 1 |
| Data | 1 | 0 | 1 | 0 | 1 | 0 | 0 | 1 | 0 | 1 | 0 | 1 | 1 | 0 |

The above modified display data Y is sent for display, and the effective time of the OE signal is set to 1/4 of the complete time of the OE signal, thereby sequentially modifying and displaying the data to be displayed of the serial display data chain.

In the above embodiments, preferably, before step B3, further executes the step of: the effective number of bits L is set according to the number of bits N of the data to be displayed; and in step B3, the data to be displayed is shifted to left by C bits, and the L-bit data is captured from the highest bit to serve as the modified display data for display. For example, when N is 16, L is a natural number between 4 and 16 or is a natural number between 5 and 15, for example, 9 or 10. For example, L is 8, and when C is 3, in step A3, the data to be displayed is shifted to left by 3 bits, and the 8-bit data is captured from the highest bit to serve as the modified display data for display.

For example, it is assumed that the data to be displayed is as shown in the following table:

| | Bit Number | | | | | | | | | | | | | | | |
|---|---|---|---|---|---|---|---|---|---|---|---|---|---|---|---|---|
| | 16 | 15 | 14 | 13 | 12 | 11 | 10 | 9 | 8 | 7 | 6 | 5 | 4 | 3 | 2 | 1 |
| Data | 0 | 0 | 0 | 1 | 0 | 0 | 1 | 0 | 1 | 1 | 0 | 1 | 0 | 1 | 0 | 1 |

The highest non-zero bit M=13, C=16−M=3. The data to be displayed is shifted to left by 3 bits, and the 8-bit data is captured from the highest bit to obtain the modified display data as shown in the following table:

| | Bit Number | | | | | | | |
|---|---|---|---|---|---|---|---|---|
| | 8 | 7 | 6 | 5 | 4 | 3 | 2 | 1 |
| Data | 1 | 0 | 0 | 1 | 0 | 1 | 1 | 0 |

At this time, the highest 3 bits and lowest 5 bits of the original data to be displayed are discarded, and the modified display data is adopted for display. Also, one display data has 24 bits as shown in the following table:

| | Bit Number | | | | | | | | | | | | | | | | | | | | | | | |
|---|---|---|---|---|---|---|---|---|---|---|---|---|---|---|---|---|---|---|---|---|---|---|---|---|
| | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 |
| Data | 0 | 0 | 0 | 0 | 0 | 1 | 0 | 0 | 0 | 0 | 1 | 1 | 1 | 0 | 1 | 0 | 0 | 1 | 0 | 1 | 0 | 0 | 1 | 0 |

The highest non-zero bit M is the 19th bits, C=24−M=5. When L is 16, the data to be displayed is shifted to left by 5 bits, the 16-bit data is captured from the highest bit to obtain the modified display data as shown in the following table:

| Bit Number | | | | | | | | | | | | | | | |
|---|---|---|---|---|---|---|---|---|---|---|---|---|---|---|---|
| 16 | 15 | 14 | 13 | 12 | 11 | 10 | 9 | 8 | 7 | 6 | 5 | 4 | 3 | 2 | 1 |
| Data 1 | 0 | 0 | 0 | 0 | 1 | 1 | 1 | 0 | 1 | 0 | 0 | 1 | 0 | 1 | 0 |

At this time, the highest 5 bits and lowest 4 bits of the original data to be displayed are discarded, and the modified display data is adopted for display.

In the related embodiments, before step B3, the following steps are executed.

A relationship table between the number of bits N of the data to be displayed and the effective number of bits L is preset. A relationship table between the value of N and the value of L may be established, and generally, N is set to be greater than L. Preferably, L is 1/2 of N. According to the value of N, the effective number of bits L is selected. Alternatively, a relationship table between the highest brightness loss rate and the value of L may be established and the effective number of bits L is selected according to the highest brightness loss rate.

According to the number of bits N of the data to be displayed, the effective number of bits L is selected from the relationship table. Also, in step A3, the data to be displayed is shifted to left by C bits, and the L-bit data is captured from the highest bit to serve as the modified display data for display.

In any of the above embodiments, in another example, after step A3, step A4 is executed: the modified display data is adopted for display according to the effective time of the OE signal. For example, in step A4, the OE signal with the incomplete time cycle is adopted to serve as the effective output signal, and the display output number is increased by a multiple of Cth power of 2.

Specifically, in another embodiment, only the data starting from the highest effective bit M is reserved for display, thereby increasing the display refresh rate on the basis of reducing the whole display cycle time. In the above examples, the dynamic self-adaptive algorithm increases the display number, and the response display time is inevitably increased, which needs to be reduced accordingly in each display time segment. For example, the specific realization method includes: the OE time is 1/Cth power of 2 of the original time, or 1/C. Also, in the applications of the above examples, in the method, for the data in a descending order of bits, the L-bit data is reserved merely starting from the highest non-zero bit M.

In another embodiment, the display data whose highest bit is not 1 is shifted to left by N bits to make the highest bit become 1. Then, the data is sent for display, and the OE in the same cycle is reduced in half to 1/Nth power of 2 of the original corresponding time. For example, four 16-bit data are acquired from the serial data chain to be displayed correspondingly and are displayed in binary codes, which respectively are data I 0010 1110 1010 1010, data II 0110 1010 1010 1011, data III 0001 1110 1010 1100, and data IV 0000 0011 1010 1101. All the display data whose highest bit is not 1 are shifted to left to make the highest bit become 1, and the last vacant bits may be set randomly, fully filled with 1 or fully filled with 0 to make the modified data maintain the 16 bits. For example, all the vacant bits are filled with 0 to obtain four 16-bit data, which respectively are data I 1011 1010 1010 1000, data II 1101 0101 0101 0110, data III 1111 0101 0110 0000, data IV 1110 1011 0100 0000. Then, the data is sent for display. Also, in each corresponding display output cycle, the OE signal time is set to 1/Cth power of 2 of the complete time S0 of the normal OE signal. The OE signal time S1 of the data I is S1=S0/4, the OE signal time S2 of the data II is S2=S0/2, the OE signal time S3 of the data III is S3=S0/8, and the OE signal time S4 of the data IV is S4=S0/64. Thus, due to the incomplete time function of the OE signal, the effective output signal is interrupted, and thus the display output number is increased by a multiple of the Cth power of 2, thereby increasing the refresh rate.

In another embodiment, the display data whose highest bit is not 1 is shifted to left by N bits to make the highest bit become 1. Then, the data is sent for display, and the OE in the same cycle is reduced to 1/Nth power of 2 of the original corresponding time. For example, four 16-bit data are acquired from the serial data chain to be displayed correspondingly and are displayed in binary codes, which respectively are data I 0010 1110 1010 1010, data II 0110 1010 1010 1011, data III 0001 1110 1010 1100, and data IV 0000 0011 1010 1101. All the display data whose highest bit is not 1 are shifted to left to make the highest bit become 1 and obtain four data with different bits, which are respectively 14-bit data I 10 1110 1010 1010, 15-bit data II 110 1010 1010 1011, 13-bit data III 1 1110 1010 1100, and 10-bit data IV 11 1010 1101. Then, the data is sent for display. Also, in each correspondingly display output cycle, the OE signal time is set to 1/Cth power of 2 of the complete time S0 of the original OE signal. The OE signal time S1 of the data I is S1=S0/4, the OE signal time S2 of the data II is S2=S0/2, the OE signal time S3 of the data III is S3=S0/8, and the OE signal time S4 of the data IV is S4=S0/64. Thus, due to the incomplete time function of the OE signal, the effective output signal is interrupted, and thus the display output number is increased by a multiple of the Cth power of 2, thereby increasing the refresh rate.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described.

What is claimed is:

1. A method of uniform distribution for increasing a display rate, comprising the steps of:
   for data to be displayed, dividing a complete effective output enable (OE) time that is greater than one serial shift cycle into several unit serial shift cycles and uniformly distributing the effective OE time for display; and
   displaying the data on a display device,
   wherein the data to be displayed is obtained, the data to be displayed whose highest bit is not 1 is shifted to left by C bits to serve as a modified display data for display to make the highest bit of the modified display data become one, and the OE signal time is set to 1/Cth power of 2 of the complete time of the corresponding OE signal of the original display data, and wherein C is a natural number.

2. The method according to claim 1, wherein the effective OE time is uniformly distributed for display in a pulse-width modulation (PWM) manner with a serial shift chain length as a unit.

3. The method according to claim 1, further comprising the steps of:
   acquiring K data to be displayed from a serial data chain to be displayed, in which every data to be displayed has N bits;
   arranging the K data to be displayed to be N K-bit data chains for serial shift in a descending order of the corresponding bits;
   dividing one display grayscale having Z serial shift cycles into Z independent transmission actions according to every transmission number using the serial shift time as the unit; and
   sorting in a preset order to enable transmission actions within one grayscale to be interleaved by transmission actions within other grayscales,
   wherein each of K, N and Z is a natural number.

4. The method according to claim 1, further comprising the steps of:
   step A1, according to a total number of serial shift bits and shortest switch response time, deciding time of each serial shift cycle;
   step A2, according to the number of bits of binary display data, deciding a grayscale quantity and data serial shift numbers in a descending order of bits;
   step A3, according to the grayscale quantity and the shortest switch response time, deciding a display rate, obtaining a total schedule serial shift number under the condition of the same grayscale, and obtaining an adjustment value through binary rounding;
   step A4, according to the adjustment value, reducing the grayscale quantity, setting values less than 1 to 1, obtaining the reduced data serial shift numbers in a descending order of bits, and for each value less than 1, reducing an effective time of an OE signal correspondingly to complete time of the value multiplied by the OE signal;
   calculating the reduced total serial shift number; and
   step A5, dividing the reduced total serial shift number respectively by every reduced data serial shift number in a descending order of bits, rounding and subtracting by 1, sequentially arranging, obtaining a serial shift display manner of the data in a descending order of bits in the reduced total serial shift number.

5. The method according to claim 4, further comprising:
   before step A1, executing step A0, according to the number of bits of chip serial shift and the number of the chip serial shifts, deciding the total number of serial shift bits.

6. The method according to claim 1, wherein the serial shift number of a highest effective data bit is set to Q, the serial shift number of the subsequent data bit is reduced in half sequentially until 1, all the parts less than 1 are set to 1 until all the data bits are finished, and for all the parts less than 1, the effective time of the OE signal is reduced correspondingly to the complete time of the value multiplied by the OE signal, so as to enable the total effective time of the OE in the display cycle to be the same; and
   wherein Q is a natural number.

7. The method according to claim 1, wherein the value of C is preset according to the number of bits N of the data to be displayed.

8. The method according to claim 1, wherein the data to be displayed is obtained, the highest non-zero bit M is determined, the data to be displayed is shifted to left by C bits, the C bits are a difference value between the number of bits of the display data and the highest non-zero bit M, and the effective time of the OE signal is set to 1/Cth power of 2 of the complete time of the OE signal.

9. The method according to claim 8, wherein the number of bits N of the data to be displayed is set to N-C to serve as the modified number of bits of the display data; or the number of bits N of the data to be displayed is maintained to serve as the modified number of bits of the display data, wherein the maintaining the number of bits N of the data to be displayed comprises: after the shifting the data to be displayed to left by C bits, randomly filling, fully filling 1 or fully filling 0 in all the C bits vacated on the right of the data to be displayed.

10. The method according to claim 9, further comprising the steps of:
    step B1, obtaining the data to be displayed and determining the highest non-zero bit M;
    step B2, subtracting the number of bits N of the data to be displayed by the highest non-zero bit M to obtain a difference value C; and
    step B3, shifting the data to be displayed to left by C bits to serve as the modified display data for display and setting the effective time of the OE signal to 1/Cth power of 2 of the complete time of the OE signal.

11. The method according to claim 10, further comprising the steps of:
    initializing system data,
    obtaining data to be displayed from the serial display data chain in sequence, wherein for any data to be displayed X,
    determining the highest non-zero bit M,
    setting C=16−M,
    shifting the data to be displayed X to left by C bits,
    obtaining the modified display data Y,
    sending for 16-bit display, and
    setting the effective time of the OE signal to 1/Cth power of 2 of the complete time of the OE signal; and
    repeating the obtaining step, thereby sequentially modifying and displaying the data to be displayed till the end of the serial display data chain.

12. The method according to claim 10, before step B3, further comprising:
    according to the number of bits N of the data to be displayed, setting or selecting the effective number of bits L,
    wherein in step B3, shifting the data to be displayed to left by C bits and capturing L-bit data from the highest bit to serve as the modified display data for display; and
    wherein L is a natural number.

13. The method according to claim 10, further comprising:
    before step B3, presetting a relationship table of the number of bits N of the data to be displayed and the effective number of bits L; and
    according to the number of bits N of the data to be displayed, selecting the effective number of bits L from the relationship table,
    wherein in step B3, shifting the data to be displayed to left by C bits and capturing the L-bit data from highest bit to serve as the modified display data for display.

14. The method according to claim 13, further comprising:
after step B3, executing step B4, employing the modified display data for display according to the effective time of the OE signal.

15. The method according to claim 14, wherein in step B4, the OE signal having the incomplete time cycle is employed as the effective output signal and the display output number is increased by a multiple of the Cth power of 2.

16. The method according to claim 1, further comprising:
a preset step, according to the number of bits N of the data to be displayed, setting the effective number of bits L; and
a capture and call display step, for the display data, reducing the data chain length to L to serve as the modified display data for display and setting the OE signal time to 1/Cth power of 2 of the complete time of the OE signal corresponding to the original data to be displayed, wherein L is a natural number.

17. The method according to claim 16, wherein in the capture and call display step, for the display data, according to the effective number of bits L, starting from the first high bit 1 of the display data having a length of N bits, sequentially captures the L-bit data output to serve as the modified display data for display.

18. The method according to claim 1, wherein the effective time of the OE signal of the grayscale data is reduced to be smaller than one display output time and all levels of data are uniformly distributed in the whole display cycle; or for the data in a descending order of bits, P-bit data is reserved starting from the highest non-zero bit M; and wherein P is a natural number.

19. The method according to claim 18, wherein only the value of the grayscale quantity greater than or equal to 1 is reduced to obtain the P-bit data.

* * * * *